US010083137B2

(12) United States Patent
Schumacher et al.

(10) Patent No.: US 10,083,137 B2
(45) Date of Patent: Sep. 25, 2018

(54) PERIPHERAL INTERFACE CIRCUIT FOR SERIAL MEMORY

(71) Applicant: Atmel Corporation, San Jose, CA (US)

(72) Inventors: Frédéric Schumacher, Trets (FR); Guillaume Pean, Aix en Provence (FR); Renaud Tiennot, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 512 days.

(21) Appl. No.: 14/677,817

(22) Filed: Apr. 2, 2015

(65) Prior Publication Data

US 2016/0292109 A1 Oct. 6, 2016

(51) Int. Cl.
*G06F 3/00* (2006.01)
*G06F 13/362* (2006.01)
*G06F 13/16* (2006.01)
*G06F 13/42* (2006.01)

(52) U.S. Cl.
CPC ...... *G06F 13/3625* (2013.01); *G06F 13/1673* (2013.01); *G06F 13/4282* (2013.01)

(58) Field of Classification Search
None
See application file for complete search history.

(56) References Cited

U.S. PATENT DOCUMENTS 7,555,590 B2 * 6/2009 Elliot .................. G06F 1/12
                                                           375/354
7,779,539 B2    8/2010 Chen et al.

OTHER PUBLICATIONS

Quad SPI Flash: Benefits and Uses in General Purpose Microcontrollers; Oct. 2010; NXP Semiconductors, BL Microcontrollers; file:///C:/Users/rfranklin/Documents/e-Red%20Folder/14677817/20110809_S108_Cosaro.pdf; pp. 1-17 (Year: 2010).*
Saurabh Verma and Ashima S. Dabare; Understanding clock domain crossing issues; Dec. 2007; EE Times-India; pp. 1-7 (Year: 2007).*

* cited by examiner

*Primary Examiner* — Idriss N Alrobaye
*Assistant Examiner* — Richard B Franklin
(74) *Attorney, Agent, or Firm* — Fish & Richardson P.C.

(57) ABSTRACT

A peripheral interface circuit and method is disclosed for dealing with round trip delay with serial memory. In some implementations, a finite state machine is configured to introduce a delay state prior to a read data state to absorb round trip delay associated with a memory read operation. A clock module is coupled to the finite state machine and configured to delay start of a pad return clock for the read operation until completion of the delay state. A first synchronous logic is coupled to receive the pad return clock and is configured to sample and hold data from a data bus during the read data state of the memory read operation based on the pad return clock. A second synchronous logic is coupled to receive a system clock and is configured to sample the held data based on the system clock.

7 Claims, 8 Drawing Sheets

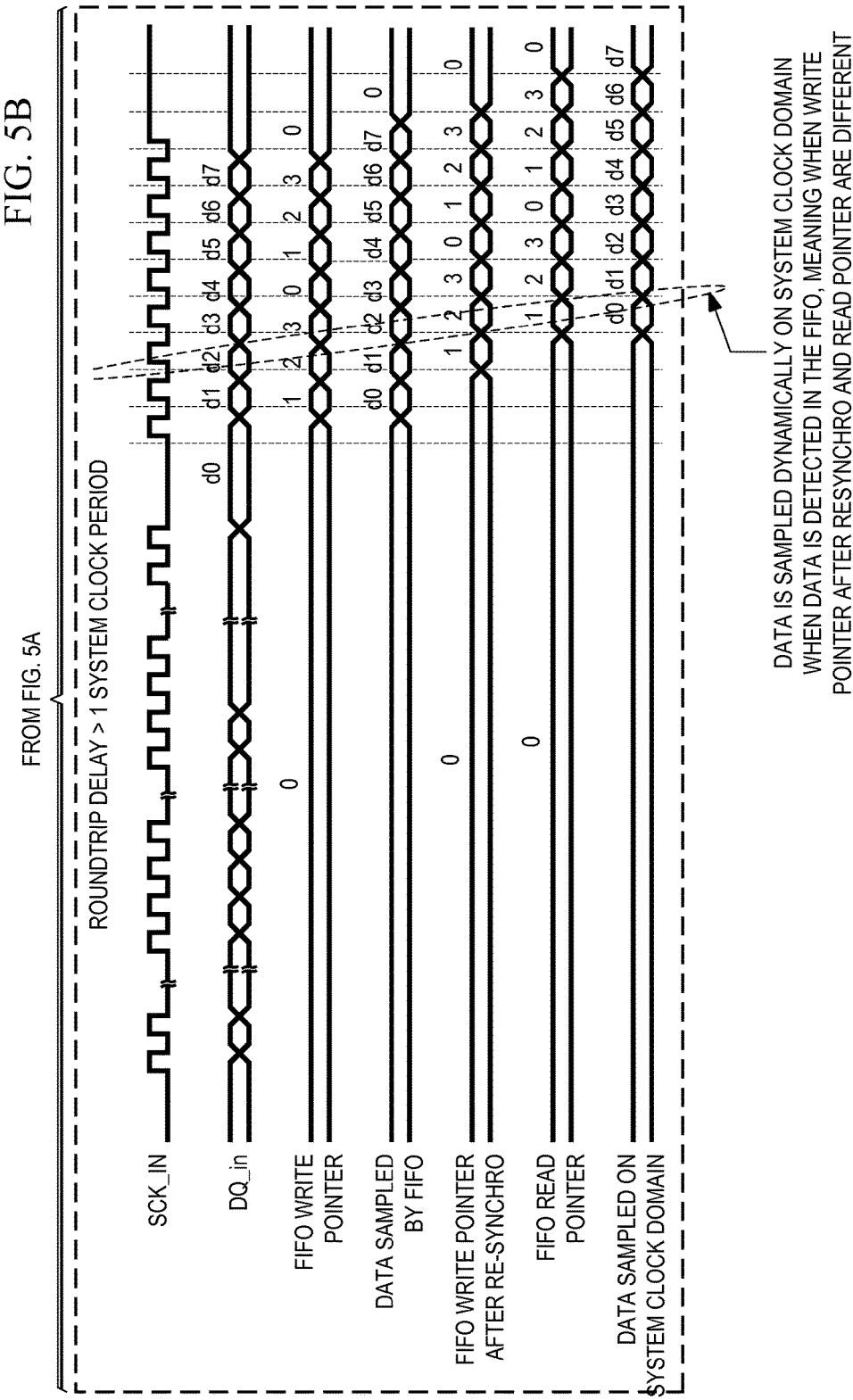

PERIPHERAL INTERFACE CIRCUIT FOR SERIAL MEMORY

TECHNICAL FIELD

This disclosure relates to dealing with round trip delay with serial memory.

BACKGROUND

Next generation microcontrollers may embed stacked serial memory to reduce silicon size and risk. New libraries, especially low power libraries, can perform poorly with stacked serial memory resulting in slow Input/Output (I/O) pads. Slow I/O pads create issues with data sampling due to high round trip delay.

SUMMARY

A peripheral interface circuit and method is disclosed for dealing with round trip delay with serial memory.

In some implementations, a peripheral interface circuit comprises a finite state machine configured to introduce a delay state prior to a read data state to absorb round trip delay associated with a memory read operation. A clock module is coupled to the finite state machine and configured to delay start of a pad return clock for the read operation until completion of the delay state. A first synchronous logic is coupled to receive the pad return clock and is configured to sample and hold data from a data bus during the read data state of the memory read operation based on the pad return clock. A second synchronous logic is coupled to receive a system clock and is configured to sample the held data based on the system clock.

In some implementations, a peripheral interface circuit comprises a sampling queue configured to sample a data line during a read data state of a memory read operation and write the sampled data into an element of the sampling queue pointed to by a write pointer. Write pointer logic coupled to the sampling queue is configured to generate the write pointer. The write pointer logic is configured to be responsive to a delay state introduced prior to the read data state to absorb round trip delay associated with the memory read operation. Resynchronization logic coupled to the write pointer logic is configured to resynchronize the write pointer. Sampling logic coupled to the sampling queue is configured to sample the element of the sampling queue, which is pointed to by a read pointer. Read pointer logic coupled to the sampling logic is configured to generate the read pointer. Pointer comparison logic coupled to the read pointer logic and the resynchronization logic is configured to trigger the sampling logic to sample the element of the sampling queue pointed to by the read pointer.

In some implementations, a method performed by a peripheral interface circuit comprises: sampling, by a sample queue, a data line during a read data state of a memory read operation and writing the sampled data into an element of a sampling queue pointed to by a write pointer; generating, by write pointer logic, the write pointer, the write pointer logic configured to respond to a delay state introduced prior to the read data state to absorb round trip delay associated with the memory read operation; resynchronizing, by the write pointer logic, the write pointer; sampling, by sampling logic, the element of the sampling queue, which is pointed to by a read pointer; generating, by read pointer logic, the read pointer; and triggering, by pointer compari-son logic, the sampling logic to sample the element of the sampling queue pointed to by the read pointer.

BRIEF DESCRIPTION OF THE DRAWINGS

FIGS. 5A and 5B are QSPI waveforms illustrating the introduction of a delay state for the asynchronous FIFO sampling logic of FIG. 4, according to one embodiment.

DETAILED DESCRIPTION

Example System

Figure 1:
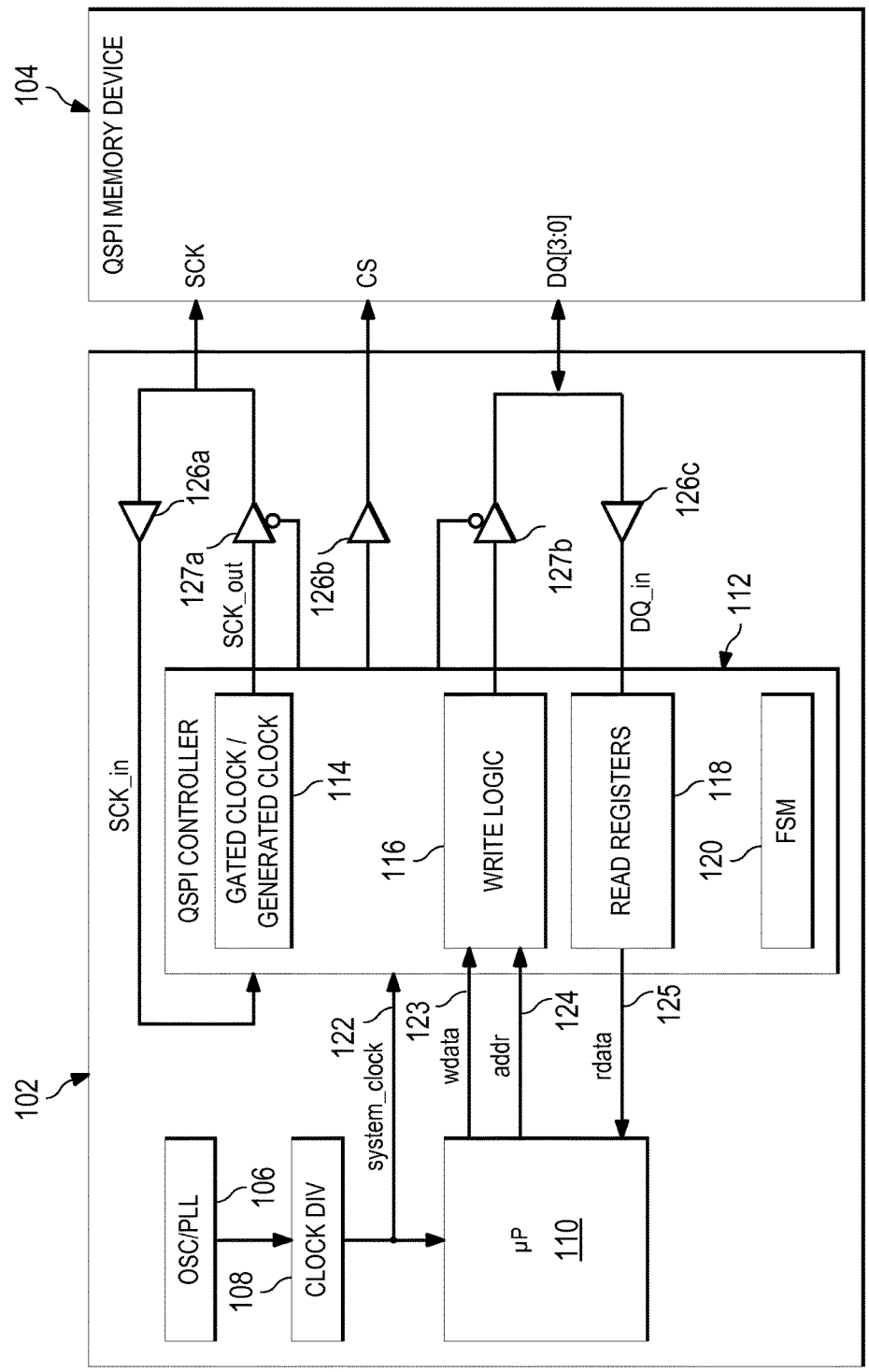
FIG. 1 is a block diagram of a microcontroller system including a quad serial peripheral interface (QSPI), according to one embodiment.

FIG. 1 is a block diagram of a microcontroller system 102 including a quad serial peripheral interface (QSPI), according to one embodiment. In some implementations, system 102 includes oscillator/phase-locked loop (PLL) block 106, clock divider 108, CPU 110 and QSPI controller 112. QSPI controller 112 includes clock module 114, write logic 116, read registers 118 and finite state machine (FSM) 120. System bus (123, 124 and 125) provides communication channels for data, memory addresses and command signals between CPU 110 and QSPI controller 112. Although the description that follows describes a QSPI, the implementations described below can work with any serial memory device.

In some implementations, an oscillator (OSC) (e.g., a crystal oscillator) in OSC/PLL block 106 can generate frequencies up to 30 MHz. To obtain higher frequencies (e.g., 100 MHz or higher) for use by CPU 110 a PLL can be employed. The PLL multiplies the frequency produced by the oscillator. System clock 122 (system_clock) is generated by dividing a clock generated by OSC/PLL block 106 using clock divider 108 (e.g., divide-by-2 circuit). System clock 122 is provided to QSPI controller 112 where it can be used to sample data stored in read registers 118, as described in more detail in reference to FIG. 3.

Referring to QSPI controller 112, write logic 116 includes circuitry for sampling data in the middle of the data window. In some implementations, write logic 116 can include double buffer sampling logic, as described in reference to FIG. 2. Write logic 116 drives read registers 118, which are configured to capture data from serial memory 104. In some implementations, write logic 116 can generate and send command signals to serial memory. For example, command signals can be sent to QSPI serial memory 104. The command signals can include Clock (SCK), Chip Select (CS) and data lines (DQ0, DQ1, DQ2, DQ3).

Clock module 114 generates and sends a pad clock (SCK_out) to the SCK pad of serial memory 104 via tri-state buffer 127a. QSPI controller 112 also receives a pad return clock (SCK_in) from the SCK pad via buffer 126a. QSPI Serial memory 104 receives control signals and data from QSPI controller 112 on control signal (CS) pad and data pad DQ [3:0], respectively, via buffers 126b, 126c and tri-state buffer 127b.

Figure 3:
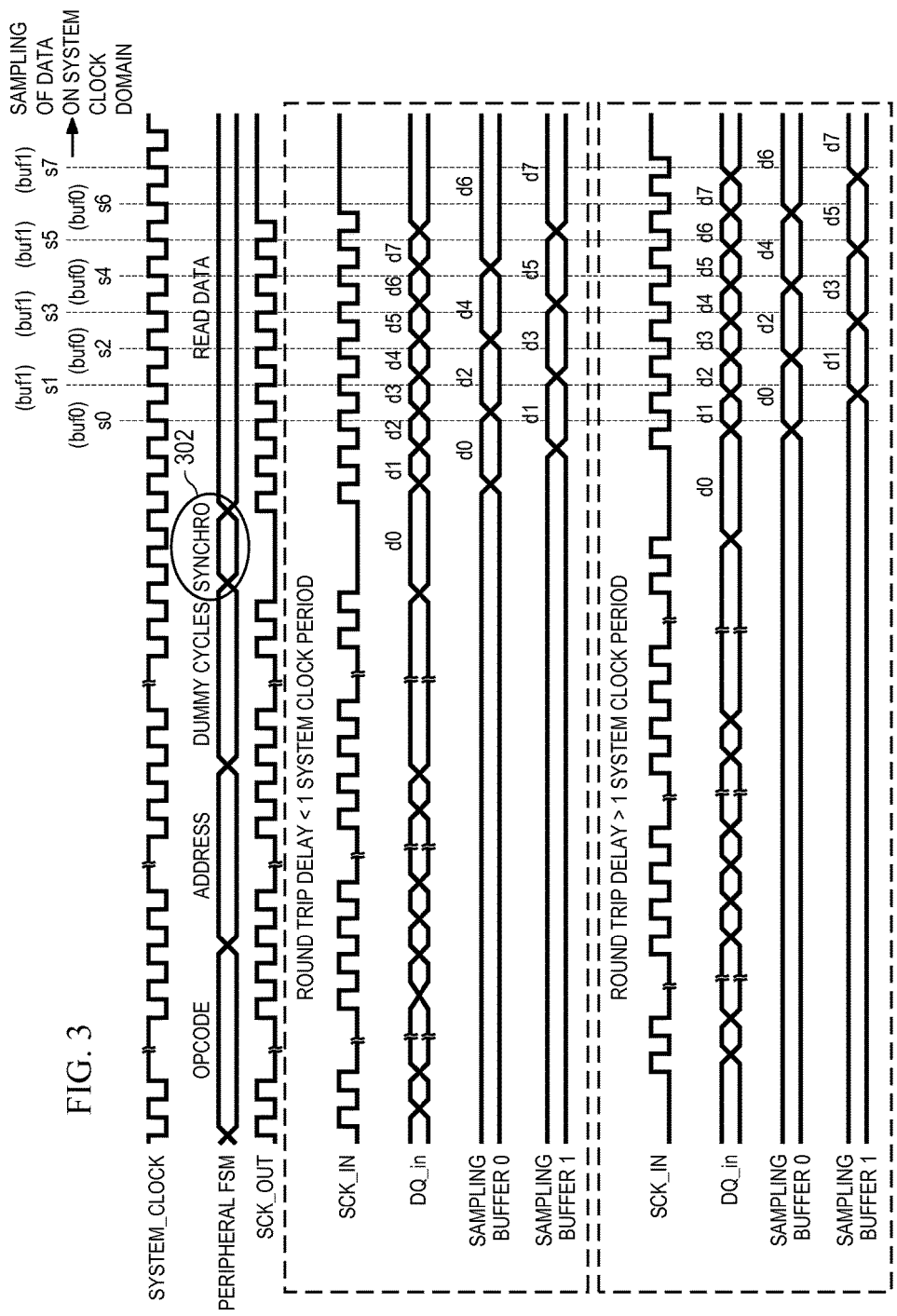
FIG. 3 is a QSPI waveform illustrating the introduction of a delay state for the double buffer sampling logic of FIG. 2, according to one embodiment.

In some implementations, FSM 120 is coupled to clock module 114, write logic 116 and read registers 118. FSM 120 can include logic (hardware and/or software) configured to implement states of a memory read operation, including introducing a delay state (SYNCHRO) between a dummy cycle state and a read data state to "absorb" round trip delay, as shown in FIG. 3. In some implementations, FSM 120 can include one or more of a programmable logic device, a programmable logic controller, logic gates and flip flops. In a hardware implementation, FSM 120 can include a register to store state variables, a first block of combinational logic which determines a state transition and a second block of combinational logic that determines the output of FSM 120. Clock module 114 can be a clock generator and/or a clock gate.

During a read data state, the sampling edge of SCK_in is used to sample the data line to avoid any clock issues such as skew or setup and hold time. The pad return sampled data is then sent back to the peripheral clock domain (system_clock domain) at the next positive edge. In some cases, the I/O pad return delay plus logic crossing delay (round trip delay) is superior to the peripheral clock period, resulting in the wrong data being sampled. To avoid this issue, FSM 120 introduces a SYNCRHO delay state after a dummy cycle state and just before the start of the read data state to absorb the round trip delay. The SYNCHRO delay state ensures that the first I/O pad return sampling edge in the read data state samples the correct buffer, as described below in reference to FIG. 2. The pad returned sampled data is sent back to the peripheral clock domain one system_clock cycle later.

Figure 2:
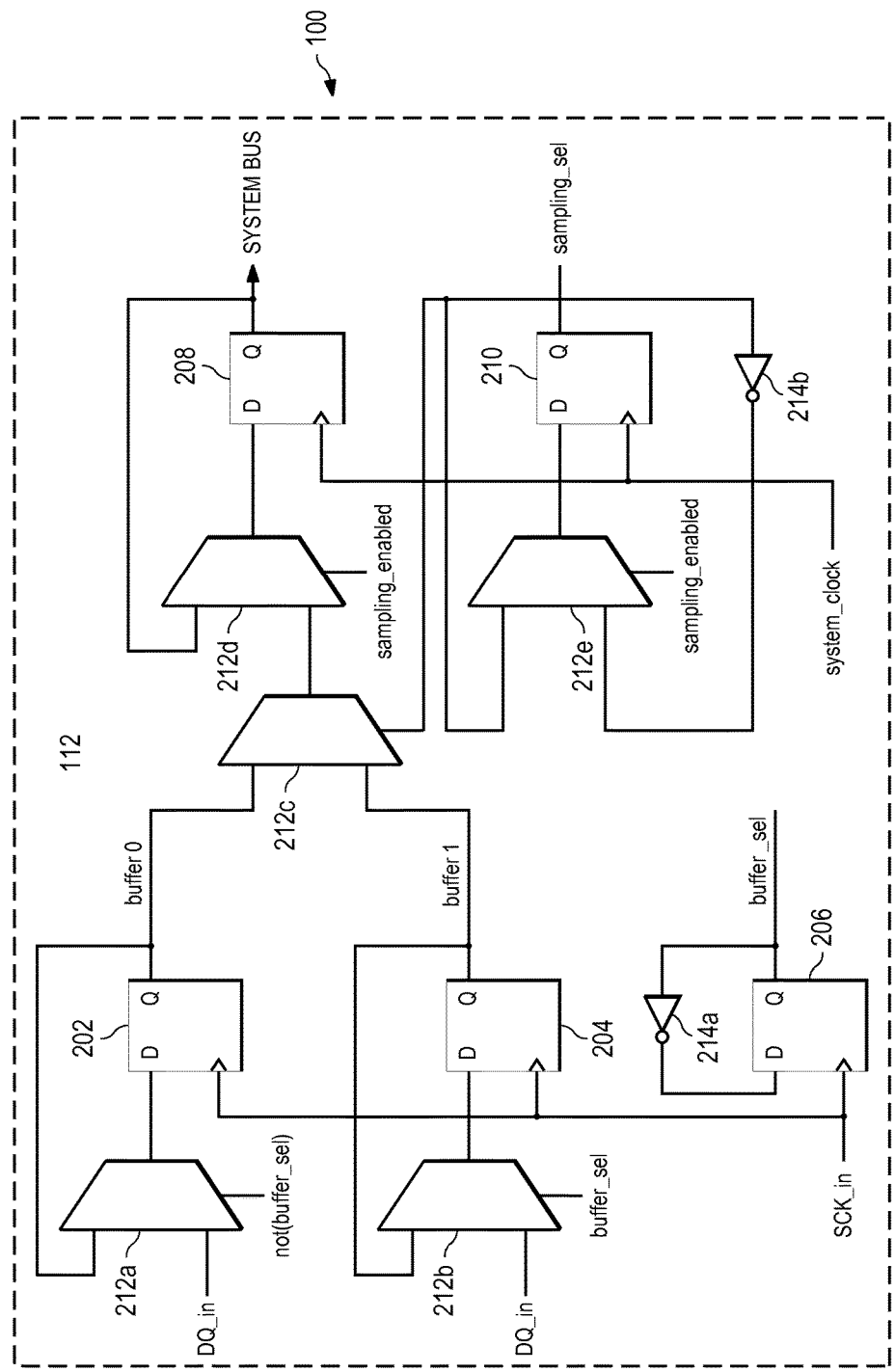
FIG. 2 is a block diagram of double buffer sampling logic included in the QSPI memory controller, according to one embodiment.

FIG. 2 is a block diagram of double buffer sampling logic included in QSPI memory controller 112, according to one embodiment. In some implementations, sampling logic 112 includes synchronous logic devices 202-210 and selection circuit 212a-212e. An example synchronous logic device is a delay flip-flop (DFF). An example selection circuit is a multiplexer (e.g., 2:1 multiplexer).

During a read data state, selection circuits 212a, 212b and synchronous logic devices 202, 204 (hereinafter also referred to as buffers 0 and 1), alternately sample the data line (DQ_in) on the rising edge of the pad return clock (SCK_in) according to a buffer select signal (buffer_sel). The buffer_sel signal is generated by synchronous logic device 206, which has its output coupled to its input through inverter 214a. In this configuration, buffer_sel toggles between logic "0" and logic "1" on each rising edge of SCK_in.

The contents of buffer 0 and 1 are alternately transferred to synchronous logic device 208 by selection circuit 212c according to a sampling signal (sampling_sel). The sampling_sel signal is generated by synchronous logic device 210, inverter 214b and selection circuit 212e according to a sampling enabled signal (sampling_enabled).

Sampling_sel is updated each time sampling_enabled is active and there is a system_clock pulse. Sampling_enabled is active one cycle when data is to be sampled, which depends on the clock divider 108 configured in system 102. In some implementations, synchronous logic device 208 transfers the data to a system bus on a rising edge of system_clock. The output of synchronous logic device 208 is a feed back to the input of selection circuit 212d to allow the data to be recirculated in synchronous logic device 208.

FIG. 3 is a QSPI waveform illustrating the introduction of a delay state for the double buffer sampling logic of FIG. 2, according to one embodiment. The top three waveforms of FIG. 3 shows the system_clock, FSM state and pad clock (SCK). Note SYNCHRO delay state 302 generated by the FSM. As shown in FIG. 3, peripheral FSM 120 generates delay state 302 (SYNCHRO) after the dummy cycle state and just before the read data state. Delay 302 results in the start of SCK_in being delayed. After SYNCHRO delay state, data line DQ_in is alternately sampled and stored into buffer 0 or buffer 1 on the rising edge of each pulse of SCK_in. The data is alternately read from buffer 0 and buffer 1 on the rising edge of each pulse of system_clock. Note that buffer 0 is always read first during the read phase.

The middle and bottom waveforms illustrate the timing of the double buffer sampling that results from introducing the SYNCHRO delay state. The middle waveforms illustrate the case where the round trip delay is less than one system_clock period. The bottom waveforms illustrate the case where the round trip delay is greater than one system_clock period. Note that in both cases, the correct buffer is sampled by the rising edge of a pulse of the system_clock as expected.

Table I below illustrates the contents of buffers 0 and 1 for each system_clock pulse for round trip delay (RTD) less than one system_clock period. Note that buffer 0 stores the first data sample d0 and subsequent samples are held stable in buffers 0 and 1 for two system_clock cycles.

TABLE I

Example Double Buffer Sampling Logic (RTD <1 System Clock Period)

| System Clock Pulse | Buffer 0 | Buffer 1 |
|---|---|---|
| s0 | d0 | d1 |
| s1 | d2 | d1 |
| s2 | d2 | d3 |
| s3 | d4 | d3 |
| s4 | d4 | d5 |
| s5 | d6 | d5 |
| s6 | d6 | d7 |
| s7 | d6 | d7 |

Table II below illustrates the contents of buffers 0 and 1 for each system clock pulse when RTD is greater than 1 system_clock period. Note that buffer 0 stores the first data sample d0 and subsequent samples are held stable in buffers 0 and 1 for two system_clock cycles.

TABLE II

Example Double Buffer Sampling Logic (RTD >1 System Clock Period)

| System Clock Pulse | Buffer 0 | Buffer 1 |
|---|---|---|
| s0 | d0 | — |
| s1 | d0 | d1 |
| s2 | d2 | d1 |
| s3 | d2 | d3 |
| s4 | d4 | d3 |
| s5 | d4 | d5 |
| s6 | d6 | d5 |
| s7 | d6 | d7 |

Figure 4:
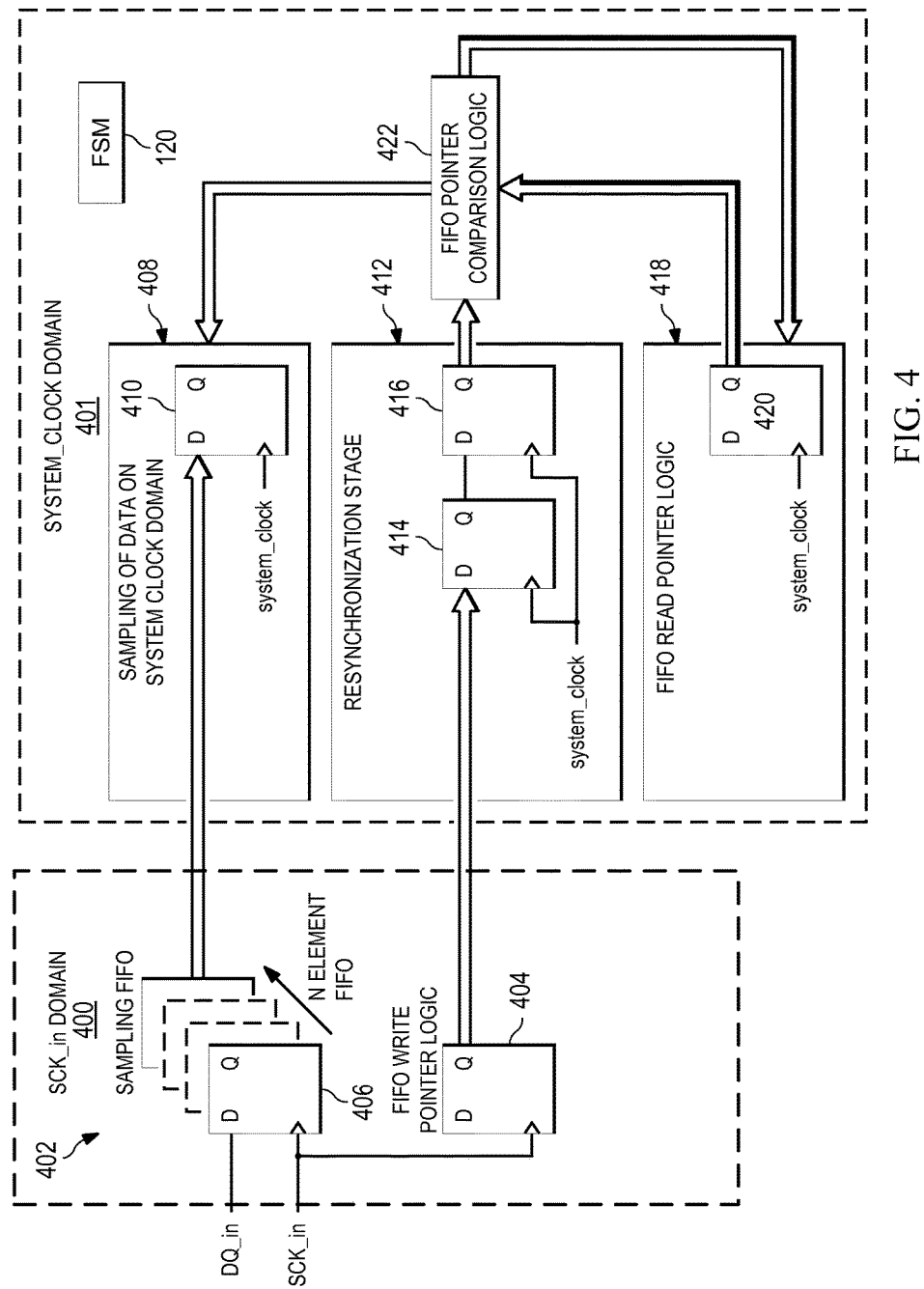
FIG. 4 is a block diagram of asynchronous FIFO sampling logic, according to one embodiment.

FIG. 4 is a block diagram of asynchronous FIFO sampling logic, according to one embodiment. In some implementations, QSPI controller 112 can include a pad return clock (SCK_in) domain 400 and system_clock domain 401. Pad return clock domain 400 includes N element sampling First-In-First-Out (FIFO) 406 and FIFO write pointer logic 404, each of which is clocked by SCK_in. Sampling FIFO 406 samples data from data line DQ_in using SCK_in. System clock domain 401 includes sampling logic 408, resynchronization logic 412, FIFO read pointer logic 418 and FIFO pointer comparison logic 422. Sampling logic 408 includes synchronous logic device 410, which is configured to sample on the system_clock domain the element of sampling FIFO 406 pointed to by the FIFO read pointer output by FIFO read pointer logic 418. FIFO read pointer logic 418 provides the FIFO read pointer, which is incremented each time a data from sampling FIFO 406 has been re-sampled on the system_clock domain by synchronous logic device 410.

Resynchronization logic 412 includes synchronous logic devices 414, 416, which are configured to use the FIFO write pointer generated on the SCK_in domain in the system_clock domain. Synchronous logic device 414 is used for synchronizing the SCK_in and system_clock domains and synchronous logic device 416 is used for anti-metastability. FIFO pointer comparison logic 422 is configured to compare the FIFO write pointer and the FIFO read pointer on the system_clock domain. When both pointers are different, then at least one data in sampling FIFO 406 has not been sampled on the system_clock domain. This condition results in FIFO pointer comparison logic 422 sending information to both sampling logic 408 and FIFO read pointer logic 418. The information enables the element in sampling FIFO 406 that is pointed to by the FIFO read pointer to be sampled by synchronous logic device 410 on the next system_clock edge. The information also enables FIFO read pointer logic 418 to increment the FIFO read pointer to point to the next element in sampling FIFO 406.

An example step-by-step operation of the asynchronous FIFO sampling logic shown in FIG. 4 is described as follows.

1. On the SCK_in edge, data on the QSPI bus is written into element 0 of sampling FIFO 406 (because the FIFO write pointer points to element 0) and FIFO write pointer logic 404 increments to value '1'.

2. On the next system_clock edge and following step (1), synchronous logic device 414 samples the FIFO write pointer and takes the value '1'.

3. On the next system_clock edge and following step (2), synchronous logic device 416 samples the output of synchronous logic device 414 and takes the value '1', so that the output of resynchronization logic 412 is now '1'.

4. After the resynchronization logic 412 output takes the value '1,' FIFO pointer comparison logic 422 performs a combinational pointer comparison and informs sampling logic 408 and FIFO read pointer logic 418 that the FIFO write pointer output by resynchronization logic 412 (value '1') is different from the FIFO read pointer (value '0'), meaning that element 0 in sampling FIFO 406 (pointed to by the FIFO read pointer) can be sampled by synchronous logic device 410.

5. On the next system_clock edge and after step (4), element 0 of sampling FIFO 406 (pointed to by the FIFO read pointer) is sampled by synchronous logic device 410 and FIFO read pointer logic 418 increments the FIFO read pointer to value '1'.

6. After the output of FIFO read pointer logic 418 takes the value '1', FIFO pointer comparison logic 422 detects that both the FIFO write pointer after resynchronization and the FIFO read pointer have the same value '1', and informs sampling logic 408 and FIFO read pointer logic 418 that there is nothing to do on the next system_clock edge.

Figure 5A:
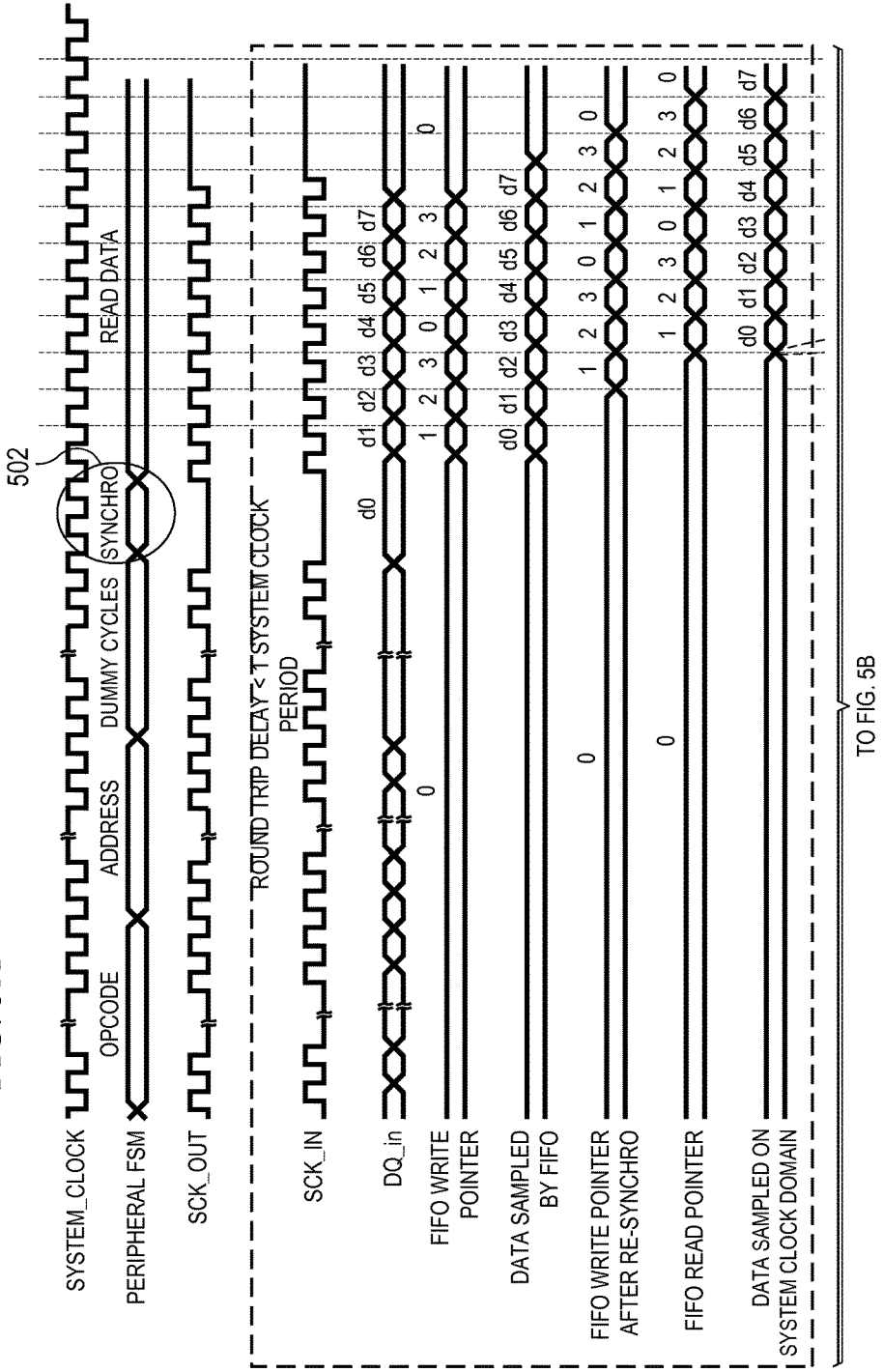

FIGS. 5A and 5B are QSPI waveforms illustrating the introduction of a delay state for the asynchronous FIFO sampling logic of FIG. 4, according to one embodiment. The top three waveforms of FIG. 5A show the system_clock, FSM state and pad clock (SCK). Note SYNCHRO delay state 502 generated by FSM 120. As shown in FIG. 5A, peripheral FSM 120 (see FIG. 1) generates delay state 502 (SYNCHRO) after the dummy cycle state and just before the read data state. Delay 502 results in the start of SCK_in being delayed. After the SYNCHRO delay state, data line DQ_in is sampled on the SCK_in edge by sampling FIFO 406 and the FIFO write pointer is incremented accordingly by FIFO write pointer logic 404. Each system_clock pulse is used by resynchronization stage 412 to send the FIFO write pointer into system_clock domain 401. On each system_clock positive edge if the FIFO write pointer after resynchronization is different from the FIFO read pointer, then data is sampled by sampling logic 408 and the FIFO read pointer is incremented accordingly by FIFO read pointer logic 418.

Bottom of FIG. 5A illustrates the case where the round trip delay is less than one system_clock period. FIG. 5B illustrates the case where the round trip delay is greater than one system_clock period. Note that in both cases, data is sampled correctly and nothing is lost.

Example Processes

Figure 6:
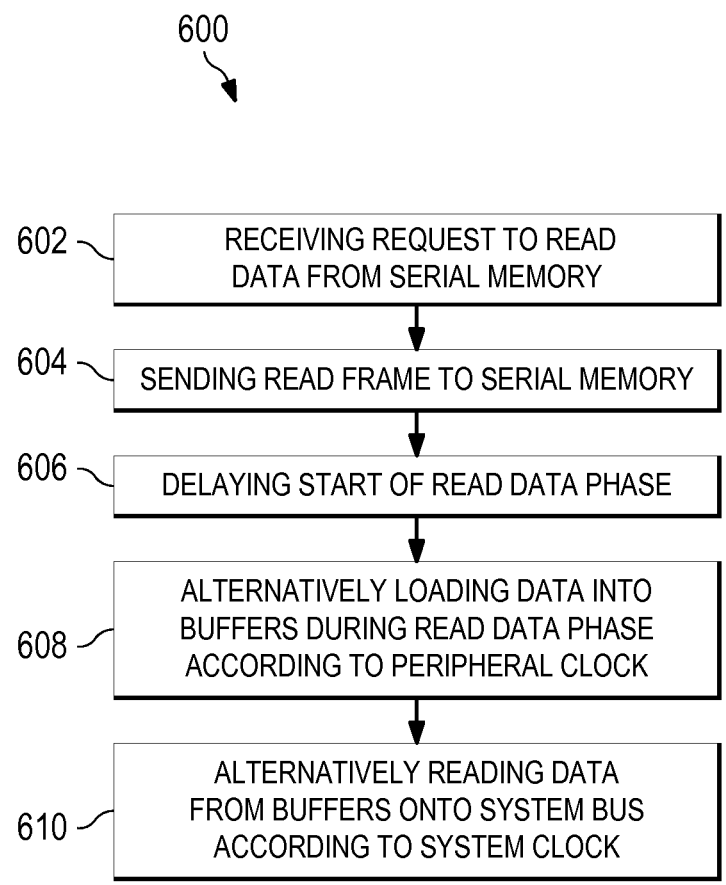
FIG. 6 is a process of dealing with round trip delay with serial memory using dual double buffer sampling logic, according to one embodiment.

FIG. 6 is a process 600 of dealing with round trip delay with serial memory, according to one embodiment. Process 600 can be implemented by the double buffer sampling logic described in reference to FIG. 2.

In some implementations, process 600 can begin when a memory controller receives a request to read data from serial memory (602). The request can be from, for example, a CPU. Serial memory can be, for example, QSPI serial memories (e.g., QSPI flash, HyperRAM®, Serial NOR flash memory).

Process 600 can continue by sending a read frame to the serial memory (604). For example, an opcode, memory address and one or more dummy cycles can be sent by the memory controller to the serial memory.

Process 600 can continue by introducing a delay state after the dummy cycle state and before a read data state (606). For example, a FSM in the memory controller can introduce the delay state, which delays the start of a pad return clock to delay sampling a data line between the memory controller and the serial memory.

Process 600 can continue by alternately loading data samples into double buffers during the read data state in response to the pad return clock (608).

Process 600 can continue by alternately reading data samples from the double buffers on a system clock domain (610). In some implementations, the data samples can be read from the buffers and transferred to a system bus to be processed by another device (e.g., CPU 110).

Figure 7:
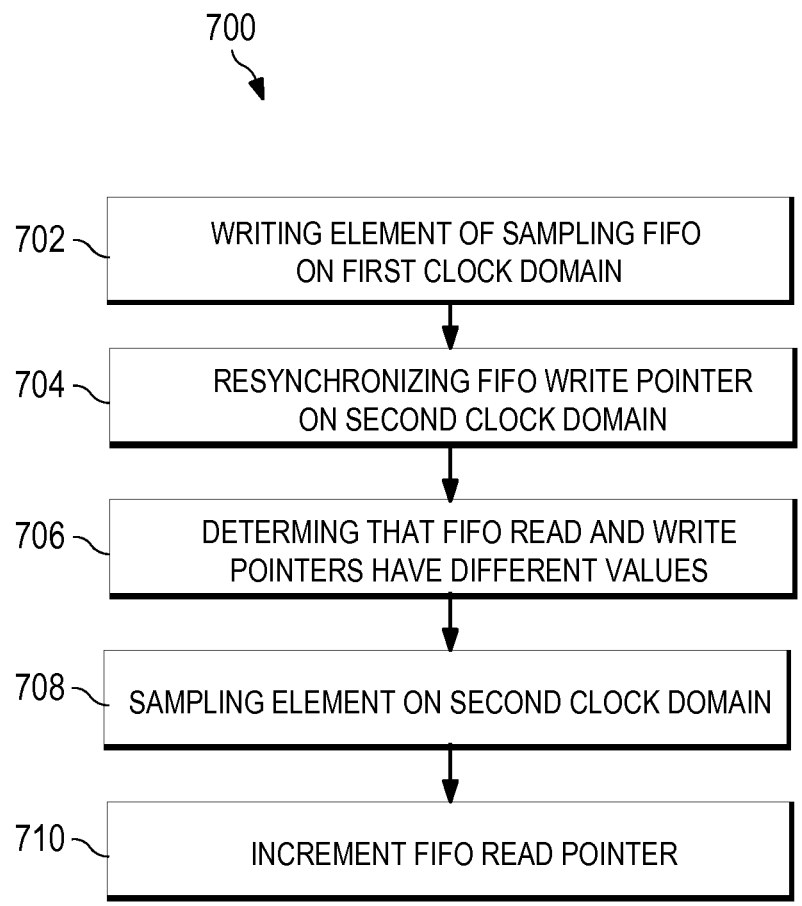
FIG. 7 is a process of dealing with round trip delay with serial memory using asynchronous FIFO sampling logic, according to one embodiment.

FIG. 7 is a process 700 of dealing with round trip delay with serial memory using asynchronous FIFO sampling logic, as described in reference to FIG. 4. Process 700 can be implemented by the asynchronous FIFO sampling logic described in reference to FIG. 4.

In some implementations, process 700 can begin by writing, on a first clock domain, an element of a sampling FIFO that is pointed to by a FIFO write pointer (702). Process 700 can continue by resynchronizing the FIFO write pointer on a second clock domain (704). Process 700 can continue by determining that the resynchronized FIFO write pointer and a FIFO read pointer have different values (706), sampling the element of the sampling FIFO on the second clock domain (708) and incrementing the FIFO read pointer to point to a next element of the sampling FIFO (710).

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A peripheral interface circuit for serial memory, the circuit comprising:
    a sampling queue configured to sample a data line during a read data state of a memory read operation and write the sampled data into an element of the sampling queue pointed to by a write pointer;
    a finite state machine configured to introduce a delay state after a dummy cycle state and prior to the read data state to absorb round trip delay associated with the memory read operation;
    write pointer logic coupled to the sampling queue and configured to generate the write pointer, the write pointer logic configured to be responsive to the delay state introduced prior to the read data state;
    resynchronization logic coupled to the write pointer logic and configured to resynchronize the write pointer;
    sampling logic coupled to the sampling queue, the sampling logic configured to sample the element of the sampling queue, which is pointed to by a read pointer;
    read pointer logic coupled to the sampling logic and configured to generate the read pointer; and
    pointer comparison logic coupled to the read pointer logic and the resynchronization logic, the pointer comparison logic configured to trigger the sampling logic to sample the element of the sampling queue pointed to by the read pointer.

2. The peripheral interface circuit of claim 1, where the peripheral interface circuit is a quad serial peripheral interface (QSPI).

3. The peripheral interface circuit of claim 1, where the sampling queue and write pointer logic are coupled to a pad return clock and the resynchronization logic, read pointer logic and sampling logic are coupled to a system clock, and the pad return clock and system clock have different clock frequencies.

4. The peripheral interface circuit of claim 1, where the read pointer logic is configured to increment the read pointer based on output of the pointer comparison logic.

5. The peripheral interface circuit of claim 1, where the sampling queue includes N elements comprising N delay flip-flops.

6. The peripheral interface circuit of claim 1, where the resynchronization logic includes two or more delay flip-flops coupled in series.

7. A method of dealing with round trip delay with serial memory, the method comprising:
    sampling, by a sample queue, a data line during a read data state of a memory read operation and writing the sampled data into an element of a sampling queue pointed to by a write pointer;
    generating, by a finite state machine, a delay state following a dummy cycle state and prior to the read data state to absorb round trip delay associated with the memory read operation;
    generating, by write pointer logic, the write pointer, the write pointer logic configured to respond to the delay state introduced prior to the read data state;
    resynchronizing, by the write pointer logic, the write pointer;
    sampling, by sampling logic, the element of the sampling queue, which is pointed to by a read pointer;
    generating, by read pointer logic, the read pointer; and
    triggering, by pointer comparison logic, the sampling logic to sample the element of the sampling queue pointed to by the read pointer.

* * * * *